(12) United States Patent
Schushan et al.

(10) Patent No.: US 9,336,112 B2
(45) Date of Patent: May 10, 2016

(54) PARALLEL STATUS POLLING OF MULTIPLE MEMORY DEVICES

(75) Inventors: Asaf Schushan, Ramat Hasharon (IL); Barak Rotbard, Tel-Aviv (IL)

(73) Assignee: Apple Inc., Cupertino, CA (US)

( * ) Notice: Subject to any disclaimer, the term of this patent is extended or adjusted under 35 U.S.C. 154(b) by 303 days.

(21) Appl. No.: 13/592,514

(22) Filed: Aug. 23, 2012

(65) Prior Publication Data

US 2013/0339555 A1 Dec. 19, 2013

Related U.S. Application Data

(60) Provisional application No. 61/661,503, filed on Jun. 19, 2012.

(51) Int. Cl.
  G06F 3/00 (2006.01)
  G06F 11/30 (2006.01)
  G06F 13/16 (2006.01)
  G06F 3/06 (2006.01)

(52) U.S. Cl.
  CPC .......... *G06F 11/3037* (2013.01); *G06F 3/0613* (2013.01); *G06F 3/0653* (2013.01); *G06F 3/0655* (2013.01); *G06F 3/0683* (2013.01); *G06F 11/3055* (2013.01); *G06F 13/1678* (2013.01); *G06F 13/1684* (2013.01)

(58) Field of Classification Search
  None
  See application file for complete search history.

(56) References Cited

U.S. PATENT DOCUMENTS

| | | | |
|---|---|---|---|
| 5,751,987 A * | 5/1998 | Mahant-Shetti et al. ......... 711/5 |
| 5,892,981 A | 4/1999 | Wiggers | |
| 6,253,297 B1 * | 6/2001 | Chauvel ................. G06F 13/28 711/154 |
| 6,493,793 B1 * | 12/2002 | Pereira et al. ................. 711/108 |
| 6,834,322 B2 * | 12/2004 | Sukegawa ...................... 711/103 |
| 7,284,077 B2 | 10/2007 | Duncan et al. | |
| 7,590,796 B2 * | 9/2009 | Rajan et al. .................... 711/103 |
| 7,843,758 B2 * | 11/2010 | Byeon ..................... 365/230.05 |
| 2002/0194415 A1 * | 12/2002 | Lindsay ................. G06F 1/263 710/305 |
| 2004/0049628 A1 * | 3/2004 | Lin et al. ........................ 711/103 |
| 2004/0057297 A1 * | 3/2004 | Jang et al. ...................... 365/200 |
| 2005/0268025 A1 * | 12/2005 | Smith et al. ................... 711/103 |
| 2008/0228996 A1 * | 9/2008 | Tan et al. ........................ 711/103 |
| 2009/0089492 A1 * | 4/2009 | Yoon et al. ..................... 711/103 |
| 2009/0273960 A1 * | 11/2009 | Kim et al. ........................ 365/51 |
| 2010/0325346 A1 | 12/2010 | Huang | |
| 2011/0276775 A1 * | 11/2011 | Schuetz ......................... 711/165 |
| 2012/0011424 A1 | 1/2012 | Schuette | |
| 2012/0144096 A1 * | 6/2012 | Schuette ....................... 711/103 |
| 2012/0210157 A1 * | 8/2012 | Wang ............................. 713/500 |

(Continued)

OTHER PUBLICATIONS

'Embedded Microprocessor Systems Design: An Introduction Using the Intel 80C188EB' pp. 349-351, by Kenneth L. Short, copyright 1998 by Prentice-Hall, Inc.*

(Continued)

*Primary Examiner* — Steven Snyder
(74) *Attorney, Agent, or Firm* — Meyertons, Hood, Kivlin, Kowert & Goetzel, P.C.

(57) ABSTRACT

An apparatus includes an interface and a processor. The interface is configured to communicate with multiple memory devices over a bus that includes a plurality of parallel data lines. The processor is configured to request the memory devices to provide respective status reports, and to receive the status reports from the memory devices such that, in a given clock cycle of the bus, the multiple status reports from the respective memory devices are received in parallel over respective different subsets of the data lines of the bus.

18 Claims, 2 Drawing Sheets

(56) References Cited

U.S. PATENT DOCUMENTS

2012/0215974 A1* 8/2012 Oh et al. .................. 711/103
2013/0339638 A1* 12/2013 Lazmi et al. .................. 711/156

OTHER PUBLICATIONS

'Proper Subset' definition from mathwords, Jul. 28, 2014.*
'Subset' definition from math-only-math, Nov. 25, 2015.*

* cited by examiner

PARALLEL STATUS POLLING OF MULTIPLE MEMORY DEVICES

CROSS-REFERENCE TO RELATED APPLICATIONS

This application claims the benefit of U.S. Provisional Patent Application 61/661,503, filed Jun. 19, 2012, whose disclosure is incorporated herein by reference.

FIELD OF THE INVENTION

The present invention relates generally to data storage, and particularly to methods and systems for memory device status reporting.

BACKGROUND OF THE INVENTION

In many memory systems, memory devices report their activity status, i.e., whether they are busy or ready to receive new commands. For example, some Flash memory devices comprise a Ready/Busy (R/B or RnB) line for reporting their activity status to a memory controller.

SUMMARY OF THE INVENTION

An embodiment of the present invention that is described herein provides an apparatus including an interface and a processor. The interface is configured to communicate with multiple memory devices over a bus that includes a plurality of parallel data lines. The processor is configured to request the memory devices to provide respective status reports, and to receive the status reports from the memory devices such that, in a given clock cycle of the bus, the multiple status reports from the respective memory devices are received in parallel over respective different subsets of the data lines of the bus.

In some embodiments, the interface is configured to communicate with each of the memory devices over all the data lines of the bus. In some embodiments, the processor is configured to exchange storage commands with each of the memory devices over all the data lines of the bus, but to receive a respective status report from each of the memory devices over only a respective subset of the data lines that is assigned to the memory device.

In an embodiment, the processor is configured to receive a respective status report from each memory device on a single respective data line that is assigned to the memory device. In a disclosed embodiment, the processor is configured to receive the multiple status reports from the respective memory devices during a single clock cycle of the bus. In another embodiment, the processor is configured to request the memory devices to provide the status reports by sending a broadcast status request to the memory devices. The processor may be configured to enable assert respective Chip Enable (CE) signals for the multiple memory devices simultaneously while sending the broadcast status request and while receiving the multiple status reports.

There is additionally provided, in accordance with an embodiment of the present invention, a method including communicating with multiple memory devices over a bus including a plurality of parallel data lines. The memory devices are requested to provide respective status reports. The status reports are received from the memory devices such that, in a given clock cycle of the bus, the multiple status reports from the respective memory devices are received in parallel over respective different subsets of the data lines of the bus.

There is also provided, in accordance with an embodiment of the present invention, a memory device including a memory and status reporting circuitry. The status reporting circuitry is configured to communicate with a memory controller over a bus including a plurality of parallel data lines, to receive from the memory controller over the data bus a request to provide a status report relating to the memory, and, in response to the request, to send the status report to the memory controller over only a subset of the data lines that is assigned to the memory device.

There is further provided, in accordance with an embodiment of the present invention, a method in a memory device. The method includes communicating with a memory controller over a bus including a plurality of parallel data lines. A request to provide a status report is received in the memory device from the memory controller over the data bus. In response to the request, the status report is sent from the memory device to the memory controller over only a subset of the data lines that is assigned to the memory device.

There is additionally provided, in accordance with an embodiment of the present invention, a system including multiple memory devices and a memory controller. The memory controller is configured to communicate with the multiple memory devices over a bus including a plurality of parallel data lines, to request the memory devices to provide respective status reports, and to receive the status reports from the memory devices such that, in a given clock cycle of the bus, the multiple status reports from the respective memory devices are received in parallel over respective different subsets of the data lines of the bus.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and systems for reporting the status of memory devices in data storage systems. In some embodiments, multiple memory devices such as Flash devices are controlled by a memory controller. The memory devices may comprise, for example, memory dies or packaged devices. The memory controller writes and retrieves data to and from the memory devices using an Input/Output (I/O) bus having multiple parallel data lines.

In the disclosed embodiments, the memory controller and the memory devices use an efficient parallel mechanism for reporting the activity status of the various memory devices to the memory controller. In order to query the memory device status, the memory controller sends a broadcast status request to the multiple memory devices. In response to the broadcast status request, the various memory devices send their activity status simultaneously over respective predefined subsets of the data lines of the I/O bus.

In an example embodiment, each memory device sends a Ready/Busy (R/B) bit on a single respective data line of the I/O bus. In this embodiment, the entire status request and response transaction is completed in two clock cycles of the I/O bus: One cycle for sending the broadcast status request, and one cycle for sending the R/B bits from the respective memory devices in parallel.

In the disclosed embodiments, the same I/O bus is used in two different manners for exchanging storage commands and for status reporting. Typically, each of the multiple memory devices is connected to the memory controller using all the data lines of the I/O bus. When exchanging storage commands (e.g., read and write commands), the memory controller communicates with any of the memory devices using all the data lines of the I/O bus. The memory controller also typically uses all the data lines for transmitting the broadcast status request. During status reporting, on the other hand, each memory device uses only the respective partial subset of the data lines that that is uniquely assigned to the memory device for reporting its status.

The disclosed technique is highly efficient in querying memory device status, especially for a large number of memory devices. Since the status reporting mechanism uses the same I/O bus used for data storage, no additional status pins or signals are needed in the memory devices or the memory controller.

System Description

Figure 1:
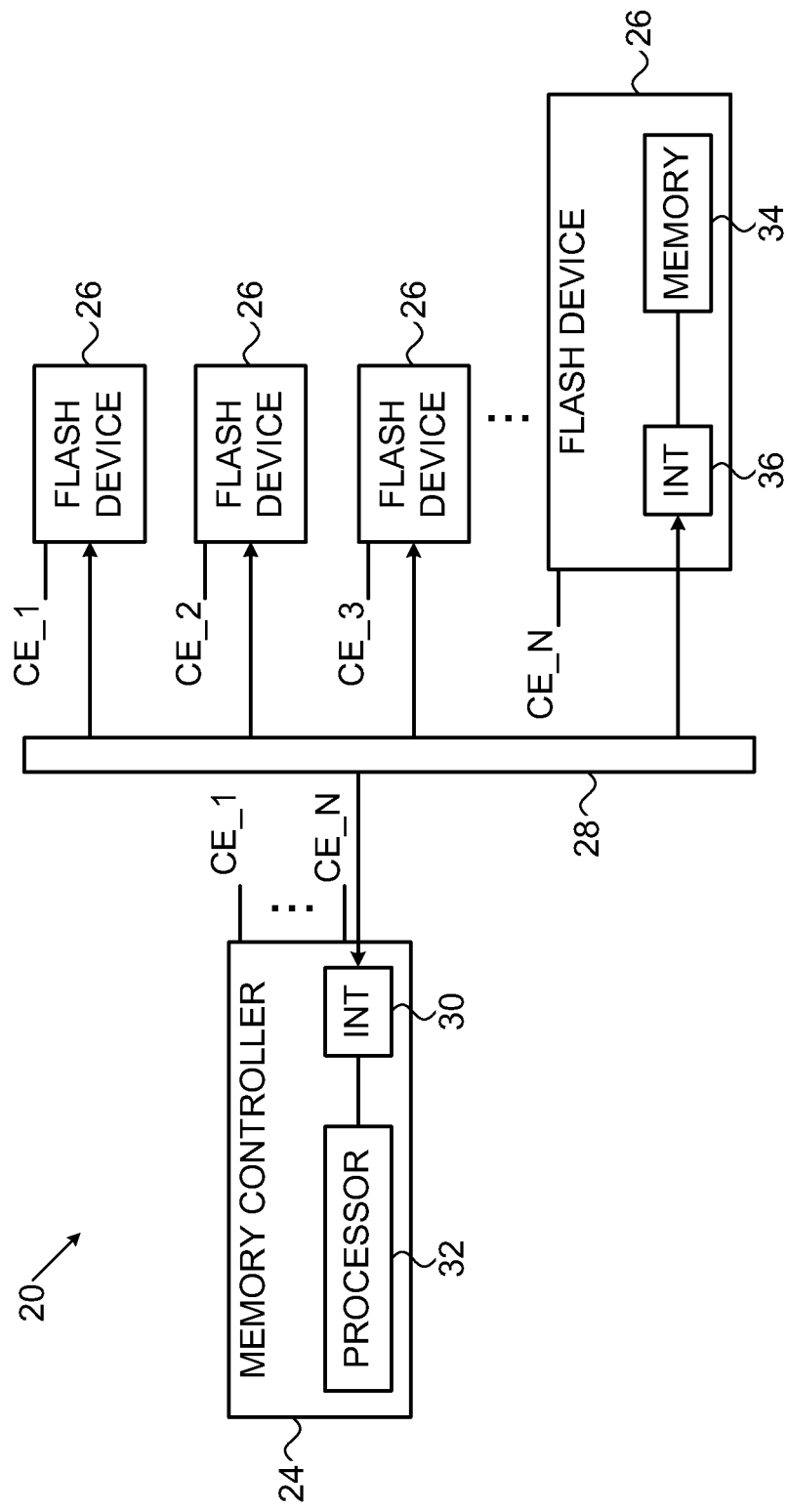
FIG. 1 is a block diagram that schematically illustrates a memory system, in accordance with an embodiment of the present invention.

FIG. 1 is a block diagram that schematically illustrates a memory system 20, in accordance with an embodiment of the present invention. System 20 comprises a memory controller 24, which stores data in multiple Flash memory devices 26 using an Input/Output (I/O) bus 28. Bus 28 comprises multiple parallel data lines, e.g., eight data lines or any other suitable number of data lines. Each Flash memory device 26 may comprise a semiconductor die or a packaged device.

In the present example, system 20 comprises a Solid State Drive (SSD) that comprises multiple memory devices 26. In alternative embodiments, however, system 20 may comprise any other suitable memory system that comprises multiple memory devices of any kind.

Memory controller 24 comprises an interface 30 for communicating with memory devices 26 over I/O bus 28, and a processor 32 that carries out the disclosed techniques. Each memory device 26 comprises a memory 34, e.g., one or more arrays of Flash memory cells, and an interface 36 for communicating with memory controller 24 over I/O bus 28. The internal structure is shown only for one of the memory devices, for the sake of clarity.

Typically, each memory device 26 can be enabled or disabled from receiving commands on bus 28 using a respective Chip Enable (CE) line. In the example of FIG. 1, system 20 comprises N memory devices that are controlled by respective CE lines denoted CE_1 ... CE_N. Memory controller 24 asserts and de-asserts the appropriate CE lines in order to enable and disable memory devices 26. Typically, a memory device whose CE line is asserted will process commands received on I/O bus 28, and a memory device whose CE line is de-asserted will disregard the I/O bus.

Memory controller 24 may be implemented in hardware. Alternatively, the memory controller may comprise a microprocessor that runs suitable software, or a combination of hardware and software elements. In some embodiments, processor 32 of memory controller 24 comprises a general-purpose processor, which is programmed in software to carry out the functions described herein. The software may be downloaded to the processor in electronic form, over a network, for example, or it may, alternatively or additionally, be provided and/or stored on tangible media, such as magnetic, optical, or electronic memory.

The system configuration of FIG. 1 is an example configuration, which is shown purely for the sake of conceptual clarity. Any other suitable memory system configuration can also be used. For example, system 20 may comprise any suitable number of memory devices of any desired type. Elements that are not necessary for understanding the principles of the present invention, such as various interfaces, addressing circuits, timing and sequencing circuits and debugging circuits, have been omitted from the figure for clarity.

In the exemplary system configuration shown in FIG. 1, Flash devices 26 and memory controller 24 are implemented as separate ICs. In alternative embodiments, however, the Flash devices and the memory controller may be integrated on separate semiconductor dies in a single Multi-Chip Package (MCP) or System on Chip (SoC), and may be interconnected by an internal bus. Further alternatively, some or all of the memory controller circuitry may reside on the same die on which one or more of the Flash devices are disposed. Further alternatively, some or all of the functionality of memory controller 24 can be implemented in software and carried out by a host. In some embodiments, the host and memory controller may be fabricated on the same die, or on separate dies in the same device package.

Parallel Status Reporting Mechanism

In the disclosed embodiments, memory controller 24 queries the status of memory devices 26, and receives status reports from the memory devices, over I/O bus 28. The embodiments described herein refer mainly to Ready/Busy (R/B) status, i.e., an indication of whether the memory device is currently ready to receive new commands on the I/O bus or whether it is currently busy executing a command. The disclosed techniques, however, can be used for querying and reporting any other suitable type of status.

In the context of the present patent application and in the claims, the term "status" refers to any information that is indicative of the present operating conditions of a memory device. Additionally or alternatively to R/B status, status types may comprise, for example, operation pass or fail and/or write protect. As yet another example, when operating in cache mode, the memory device may provide R/B status for individual circuitry, e.g., R/B for the non-volatile memory array and/or for the internal volatile buffer of the memory device.

In some embodiments, memory controller 24 queries the Ready/Busy (R/B) status of memory devices 26 in parallel, in a two-cycle transaction over I/O bus 28. In a first cycle, the memory controller sends a broadcast status request to the memory devices over the I/O bus. The memory controller typically asserts CE lines CE_1 ... CE_N during this cycle, so that all N memory devices will receive and process the status request.

In a subsequent cycle of bus 28 (which may or may not directly follow the broadcast status request), the various memory devices send their respective R/B status bits simultaneously over different respective data lines of I/O bus 28. The memory controller thus receives a parallel data word, whose bits comprise the R/B bits of the different memory devices. The memory controller typically asserts CE lines CE_1 . . . CE_N during the response cycle, as well.

Typically, each memory device 26 is pre-assigned a respective data line of bus 28 over which to transmit its R/B bit. For example, the memory controller may assign each memory device a respective unique ID, which corresponds to a respective data line index. The memory controller and the memory devices may use any suitable convention for interpreting the R/B bit value (e.g., "0" means busy and "1" means ready or vice versa).

It is important to distinguish between the two different modes of using I/O bus 28 for exchanging storage commands and for status reporting. As can be seen in FIG. 1, each memory device 26 is connected to memory controller 24 using all the parallel data lines of the I/O bus. When exchanging storage commands (e.g., read and write commands), the memory controller communicates with any of the memory devices using all the data lines of the I/O bus. When exchanging a storage command with a given memory device, the memory controller typically asserts the CE line of that memory device and de-asserts the CE lines of the other memory devices.

During status reporting, on the other hand, the memory controller asserts multiple CE lines, in the present example all the CE lines, and each memory device uses only the respective partial subset of the data lines that is uniquely assigned to it for reporting its status. All the memory devices send their status report in parallel, each memory device using its respective pre-assigned subset of the data lines. An alternative embodiment, in which only a subset of the CE lines is asserted at a time, is addressed further below.

Figure 2:
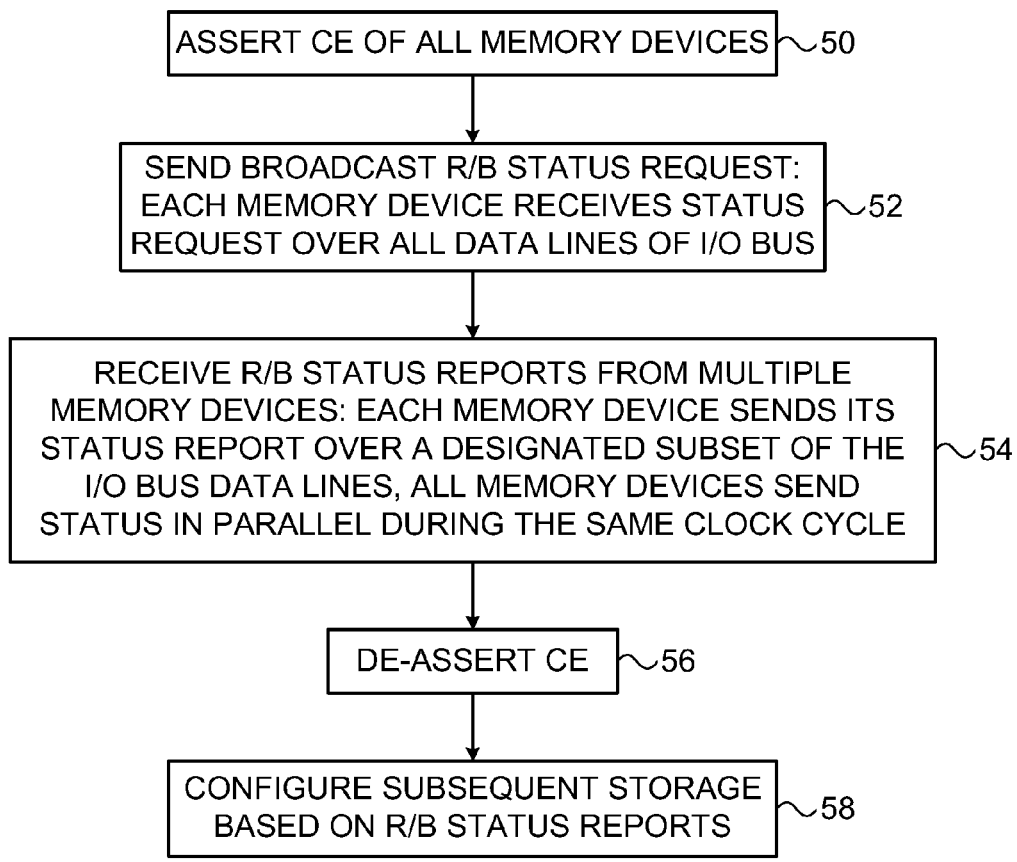
FIG. 2 is a flow chart that schematically illustrates a method for status reporting in a memory system, in accordance with an embodiment of the present invention.

FIG. 2 is a flow chart that schematically illustrates a method for status reporting in memory system 20, in accordance with an embodiment of the present invention. The method begins with memory controller 24 asserting the CE lines of all memory devices 26, at a CE assertion step 50. The memory controller then sends, via interface 30, a broadcast status request to memory devices 26 over I/O bus 28, at a request broadcasting step 52. Each memory device 26 typically receives the broadcast status request over all the data lines of the I/O bus.

In response to the broadcast status request, memory devices 26 send their respective R/B status bits simultaneously to the memory controller via interfaces 36, at a response step 54. As explained above, each memory device 26 is assigned a respective different data line of bus 28 for transmitting its R/B status bit. The memory controller receives a parallel data word that is formed from the R/B status bits of the different memory devices, and extracts the individual R/B status bits from this data word. The memory controller de-asserts the CE lines CE_1 . . . CE_N, at a CE de-assertion step 56.

In some embodiments, it is possible for the memory controller to de-assert the CE lines after transmitting the broadcast status request (i.e., following step 52), and assert them before receiving the status reports from the memory devices (i.e., prior to step 54).

Memory controller 24 then configures subsequent data storage in memory devices 26 based on the reported R/B status bits, at a configuration step 58. For example, the memory controller may send the next storage commands to memory devices that are reported as ready, and/or delay storage commands addressed to memory devices that are reported as busy.

The embodiments described above refer to configurations in which the number of memory devices 26 does not exceed the number of data lines on I/O bus 28, so that it is possible to assign each memory device a unique data line for transmitting its R/B status bit. In some system configurations, however, the number of memory devices 26 is larger than the number of data lines on bus 28. In such configurations, as well as in other configurations, memory controller 24 may divide the memory devices into groups such that the number of memory devices in each group does not exceed the number of data lines on bus 28. In these embodiments, the memory controller queries the memory device status using the above-described technique, group by group. The memory controller may address individual groups of memory devices, for example, by asserting only the desired group of CE lines and de-asserting the others.

In the embodiments described above, each memory device is assigned a single respective data line for transmitting a single R/B status bit. Generally, however, each memory device 26 may be assigned a respective subset of one or more data lines, not necessarily a single data line. Moreover, different memory devices may be assigned different numbers of data lines. This sort of assignment enables the memory devices to report more complex status reports that comprise more than a single R/B bit.

Another possibility for reporting more than a single R/B status bit from each memory device is to send the status reports from the memory devices over more than a single clock cycle of bus 28. In an example embodiment, each memory device reports two status bits over a single respective data line, during two bus cycles.

In the embodiments described herein, the status reporting functions of each memory device 26 are carried out by interface 36 of the memory device. For example, interface 36 is typically notified by the memory controller of the subset of (one or more) data lines over which the memory device is requested to provide its status report. Interface 36 typically receives the broadcast status request, formulates the status report and sends it to the memory controller over the designated subset of data lines. Generally, however, these status reporting functions can be carried out by any suitable circuitry in the memory device, not necessarily by interface 36. For example, the memory device may comprise an internal processor that handles status reporting in addition to other functions. Any such circuitry in the memory device is referred to herein as "status reporting circuitry."

Although the embodiments described herein mainly address parallel status polling from Flash memory devices, the methods and systems described herein can also be used in other applications, such as in status polling from any other suitable electronic devices.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An apparatus, comprising:
   an interface, which is configured to communicate with multiple memory devices over a bus comprising a plurality of parallel data lines; and
   a processor, which is configured to:
   assign a respective unique identifier to each of the multiple memory devices;
   issue a first single command to request that each memory device of a first proper subset of the multiple memory devices provides a respective status report, wherein each memory device of the first proper subset receives the first single command over all data lines of the plurality of parallel data lines of the bus during a first clock cycle of the bus;
   receive, in parallel, the respective status report from each memory device of the first proper subset, wherein each status report from a respective memory device of the first proper subset is received over a respective subset of the plurality data lines of the bus during a second clock cycle of the bus, and wherein the first and second clock cycles are consecutive;
   issue a second single command to request that each memory device of a second proper subset of the multiple memory devices provides a respective status report, wherein each memory device of the second proper subset receives the second single command over all data lines of the plurality of parallel data lines of the bus during a third clock cycle of the bus, and wherein the first proper subset and the second proper subset are different; and
   receive, in parallel, the respective status report from each memory device of the second proper subset, wherein each status report from a respective memory device of the second proper subset of the multiple memory devices is received over a respective subset of the plurality data lines of the bus during a fourth clock cycle of the bus, and wherein the third and fourth clock cycles are consecutive.

2. The apparatus according to claim 1, wherein the interface is further configured to communicate with each of the multiple memory devices over all data lines of the plurality of parallel data lines of the bus.

3. The apparatus according to claim 1, wherein the processor is further configured to receive the respective status report from each memory device of the first proper subset on a single respective data line of the plurality of parallel data lines that is assigned to the respective memory device of the first proper subset.

4. The apparatus according to claim 1, wherein the processor is further configured to receive the respective status report from each memory device of the first proper subset during a single clock cycle of the bus.

5. The apparatus according to claim 1, wherein to request that each memory device of the first proper subset provides the respective status report, the processor is further configured to send a broadcast status request to each memory device of the first proper subset.

6. The apparatus according to claim 5, wherein to send the broadcast status request, the processor is further configured to assert a respective Chip Enable (CE) signal for each of the multiple memory devices of the first proper subset.

7. A method, comprising:
   communicating with multiple memory devices over a bus comprising a plurality of parallel data lines;
   assigning a respective unique identifier to each of the multiple memory devices;
   sending a single command requesting that each of the multiple memory devices provides a respective status report, wherein each of the multiple memory devices receives the single command over all data lines of the plurality of parallel data lines of the bus during a first clock cycle of the bus, and wherein the respective status report from each of the multiple memory devices includes at least a first value and a second value;
   receiving the corresponding first value of the respective status report from each of the multiple memory devices in parallel during a second clock cycle of the bus, wherein each first value of each status report from a respective memory device is received over a respective different subset of the data lines of the bus dependent upon the respective unique identifier, and wherein the first and second clock cycles are consecutive; and
   receiving the corresponding second value of the respective status report from each of the multiple memory devices in parallel during a third clock cycle of the bus, wherein the second and third bus clock cycles are consecutive.

8. The method according to claim 7, wherein communicating with the multiple memory devices comprises communicating with each of the multiple memory devices over all data lines of the plurality of parallel data lines of the bus.

9. The method according to claim 7, wherein receiving the corresponding first value and the corresponding second value of the respective status report comprises receiving each first value and each second value from the respective memory device on a single respective data line that is assigned to the respective memory device.

10. The method according to claim 7, wherein receiving the corresponding first value of the respective status report comprises receiving the respective first value of the status report from each of the multiple memory devices during a single clock cycle of the bus.

11. The method according to claim 7, wherein requesting that each of the multiple memory devices provides the respective status report comprises sending a broadcast status request to each of the multiple memory devices.

12. The method according to claim 11, wherein sending the broadcast status request comprises asserting a respective Chip Enable (CE) signal for each of the multiple memory devices.

13. A memory device, comprising:
   a memory; and
   status reporting circuitry, which is configured to:
   communicate with a memory controller over a bus comprising a plurality of parallel data lines;
   receive from the memory controller a unique identifier;
   receive from the memory controller a request to provide a status report relating to the memory, wherein the request is received over all data lines of the plurality of parallel data lines of the bus during a first clock cycle of the bus, and wherein the status report includes at least a first value and a second value;
   send, in response to the request, the first value of the status report to the memory controller during a second clock cycle of the bus, wherein the first value of the status report is sent over only a proper subset of the plurality of parallel data lines that is assigned to the memory device dependent upon the unique identifier, and wherein the first and second clock cycles are consecutive; and
   send the second value of the status report during a third bus clock cycle, wherein the second value of the status report is sent over only the proper subset of the plurality of parallel data lines, and wherein the second and third bus clock cycles are consecutive.

14. A method, comprising:
in a memory device, communicating with a memory controller over a bus comprising a plurality of parallel data lines;
receiving, in the memory device from the memory controller, a unique identifier;
receiving, in the memory device, from the memory controller, a request to provide a status report, wherein the request is received over all data lines of the plurality of parallel data lines of the bus during a first clock cycle of the bus, and wherein the status report includes at least a first value and a second value;
in response to the request, sending the first value of the status report from the memory device to the memory controller during a second clock cycle of the bus, wherein the first value of the status report is sent over only a proper subset of the plurality of parallel data lines that is assigned to the memory device dependent upon the unique identifier, and wherein the first and second clock cycles are consecutive; and
sending the second value of the status report during a third bus clock cycle, wherein the second value of the status report is sent over only the proper subset of the plurality of parallel data lines, and wherein the second and third bus clock cycles are consecutive.

15. A system, comprising:
multiple memory devices; and
a memory controller, which is configured to:
communicate with the multiple memory devices over a bus comprising a plurality of parallel data lines;
assign a respective unique identifier to each memory device of the multiple memory devices;
issue a single command to request that each of the multiple memory devices provides a respective status report, wherein each of the multiple memory devices receives the single command over all data lines of the plurality of parallel data lines of the bus during a first clock cycle of the bus; and
receive the respective status report from each of the multiple memory devices in parallel during a second clock cycle of the bus, wherein each status report from a respective memory device is received over a respective subset of the data lines of the bus dependent upon the respective unique identifier, and wherein the first and second clock cycles are consecutive;
wherein the respective status report from each of the multiple memory devices includes two separate values, and wherein to receive the respective status report from each of the multiple memory devices, the memory controller is further configured to:
receive, in parallel, a corresponding first value of the respective status report from each of the multiple memory devices during the second bus clock cycle; and
receive, in parallel, a corresponding second value of the respective status report from each of the multiple memory devices during a third bus clock cycle, wherein the second and third bus clock cycles are consecutive.

16. A system, comprising:
multiple memory devices; and
a memory controller, which is configured to:
communicate with memory devices of a first proper subset of the multiple memory devices over a bus comprising a plurality of parallel data lines;
assign a respective unique identifier to each memory device of the multiple memory devices;
issue a first single command to request that each memory device of the first proper subset provides a respective status report, wherein each memory device of the first proper subset receives the first single command over all data lines of the plurality of parallel data lines of the bus during a first clock cycle of the bus;
receive the respective status report from each memory device of the first proper subset in parallel during a second clock cycle of the bus, wherein each status report from a respective memory device of the first proper subset is received over a respective subset of the data lines of the bus dependent upon the respective unique identifier, and wherein the first and second clock cycles are consecutive;
issue a second single command to request that each memory device of a second proper subset of the multiple memory devices provides a respective status report, wherein each memory device of the second proper subset receives the second single command over all data lines of the plurality of parallel data lines of the bus during a third clock cycle of the bus, and wherein the first proper subset and the second proper subset are different; and
receive, in parallel, the respective status report from each memory device of the second proper subset, wherein each status report from a respective memory device of the second proper subset of the multiple memory devices is received over a respective subset of the plurality data lines of the bus during a fourth clock cycle of the bus, and wherein the third and fourth clock cycles are consecutive.

17. An apparatus, comprising:
an interface, which is configured to communicate with multiple memory devices over a bus comprising a plurality of parallel data lines; and
a processor, which is configured to:
assign a respective unique identifier to each of the multiple memory devices;
issue a single command to request that each of the multiple memory devices provides a respective status report, wherein each of the multiple memory devices receives the single command over all data lines of the plurality of parallel data lines of the bus during a first clock cycle of the bus; and
receive, in parallel, the respective status report from each of the multiple memory devices, wherein each status report from a respective memory device is received over a respective subset of the plurality data lines of the bus during a second clock cycle of the bus, and wherein the first and second clock cycles are consecutive;
wherein the respective status report from each of the multiple memory devices includes two separate values, and wherein to receive the respective status report from each of the multiple memory devices, the processor is further configured to:
receive, in parallel, a corresponding first value of the respective status report from each of the multiple memory devices during the second bus clock cycle; and
receive, in parallel, a corresponding second value of the respective status report from each of the multiple memory devices during a third bus clock cycle, wherein the second and third bus clock cycles are consecutive.

18. A method, comprising:

communicating with multiple memory devices over a bus comprising a plurality of parallel data lines;

assigning a respective unique identifier to each of the multiple memory devices;

sending a first single command requesting that each memory device of a first proper subset of the multiple memory devices provides a respective status report, wherein each memory device of the first proper subset receives the single command over all data lines of the plurality of parallel data lines of the bus during a first clock cycle of the bus;

receiving the respective status report from each memory device of the first proper subset in parallel during a second clock cycle of the bus, wherein each status report from a respective memory device of the first proper subset is received over a respective subset of the data lines of the bus dependent upon the respective unique identifier, and wherein the first and second clock cycles are consecutive;

sending a second single command to request that each memory device of a second proper subset of the multiple memory devices provides a respective status report, wherein each memory device of the second proper subset receives the second single command over all data lines of the plurality of parallel data lines of the bus during a third clock cycle of the bus, and wherein the first proper subset and the second proper subset are different; and receive, in parallel, the respective status report from each memory device of the second proper subset, wherein each status report from a respective memory device of the second proper subset of the multiple memory devices is received over a respective subset of the plurality data lines of the bus during a fourth clock cycle of the bus, and wherein the third and fourth clock cycles are consecutive.

* * * * *